July 24, 1951 T. K. JAMISON 2,561,926
SALVAGE VESSEL
Filed Jan. 24, 1948 10 Sheets-Sheet 1
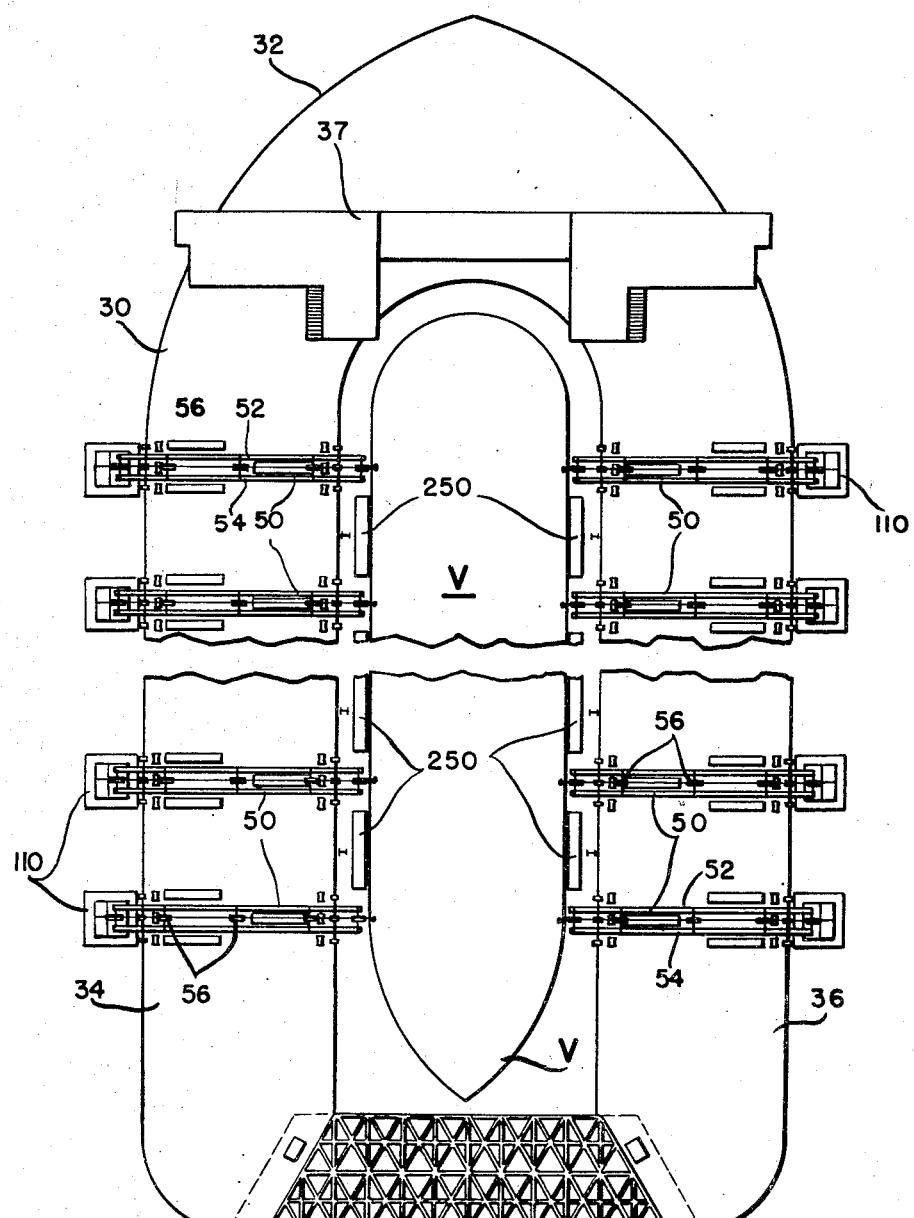
FIG—1
TRUMAN K. JAMISON
INVENTOR.
BY Smith & Tuck
ATTORNEYS

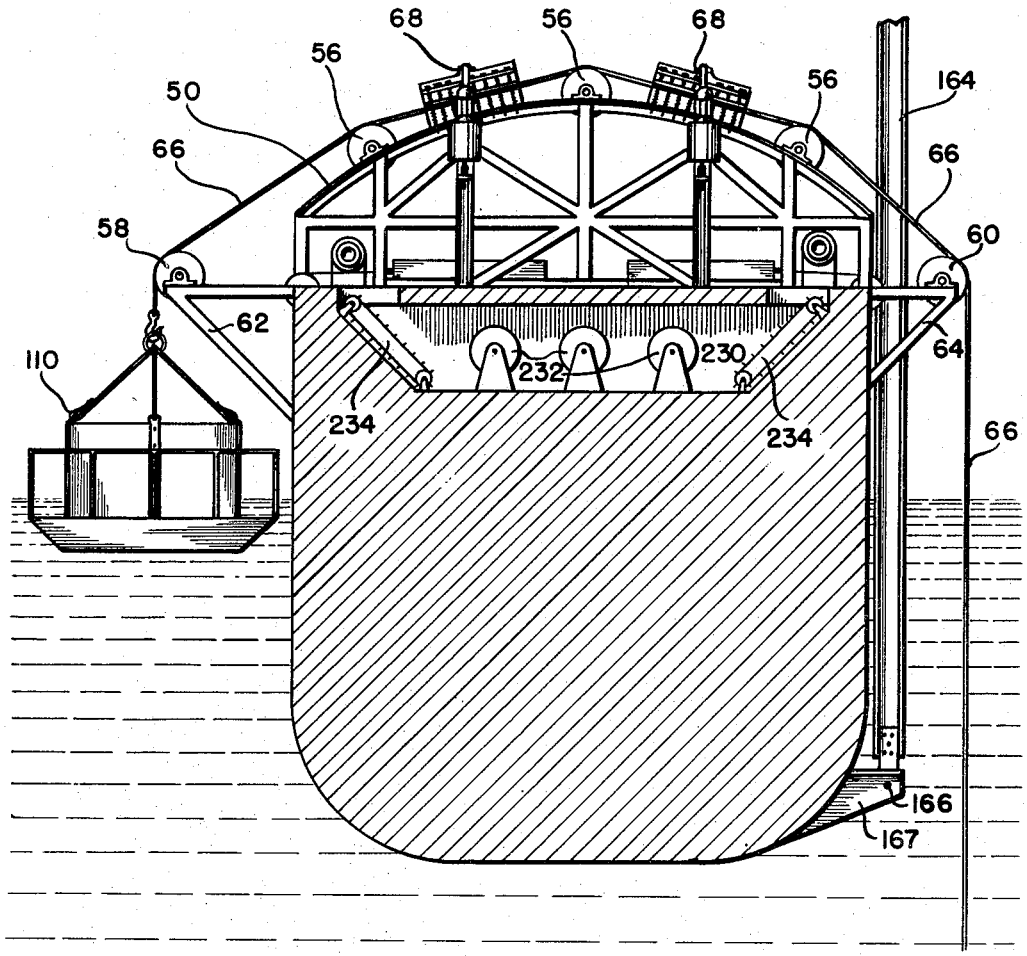
FIG_2

July 24, 1951 T. K. JAMISON 2,561,926
SALVAGE VESSEL
Filed Jan. 24, 1948 10 Sheets-Sheet 3
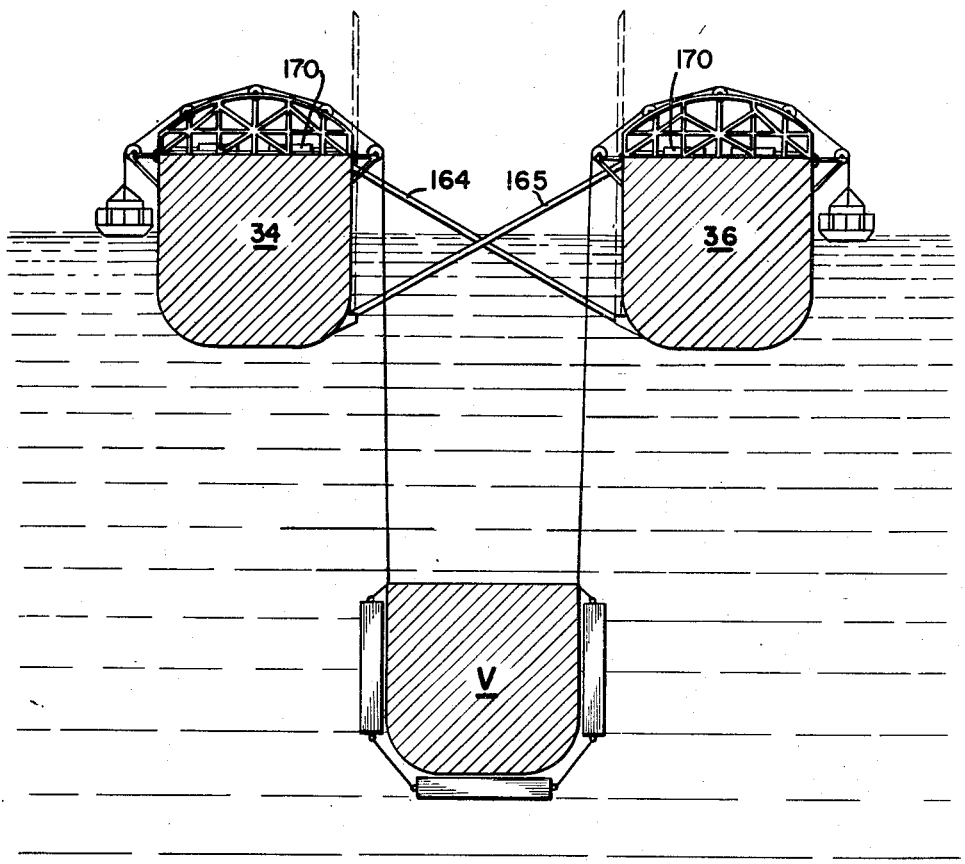
FIG__3
TRUMAN K. JAMISON
INVENTOR.
BY Smith & Tuck
ATTORNEYS

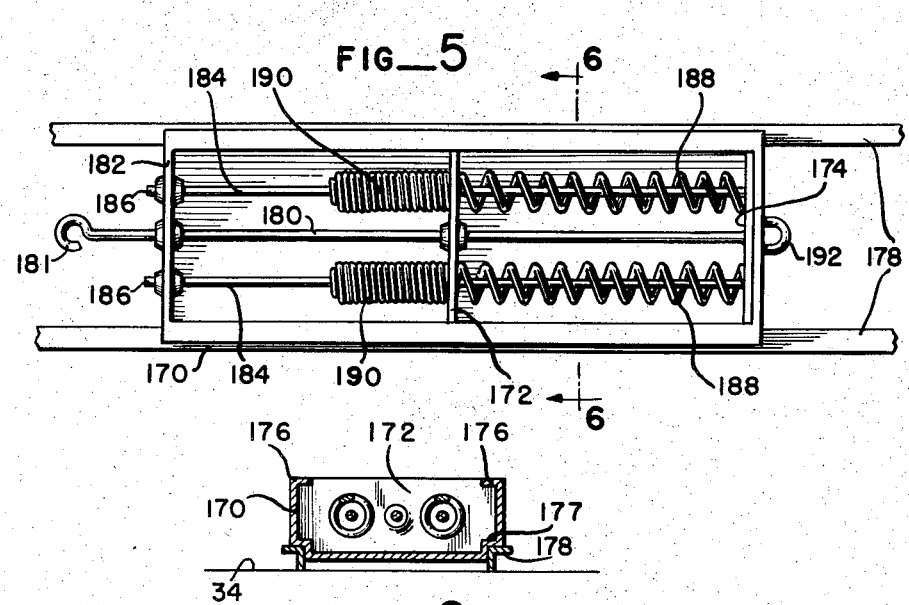
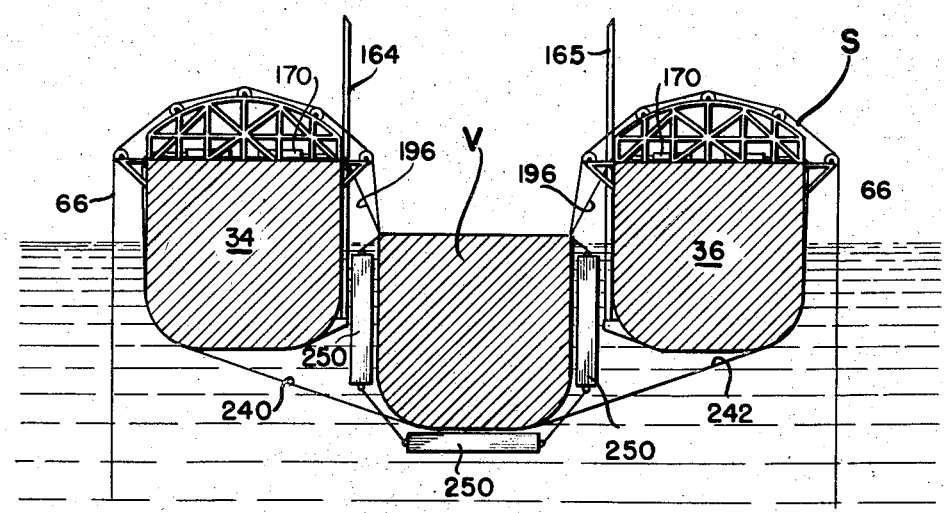

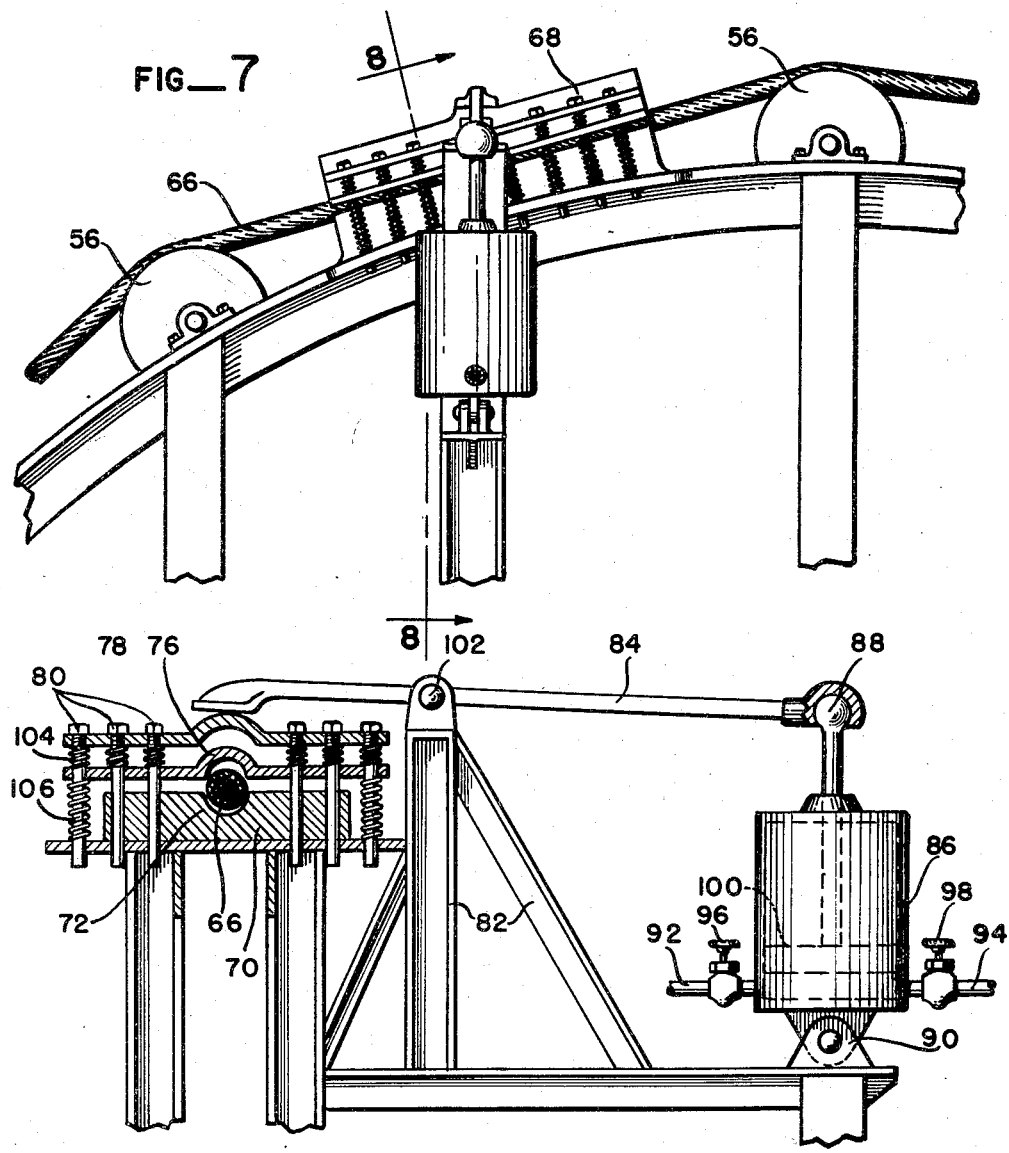

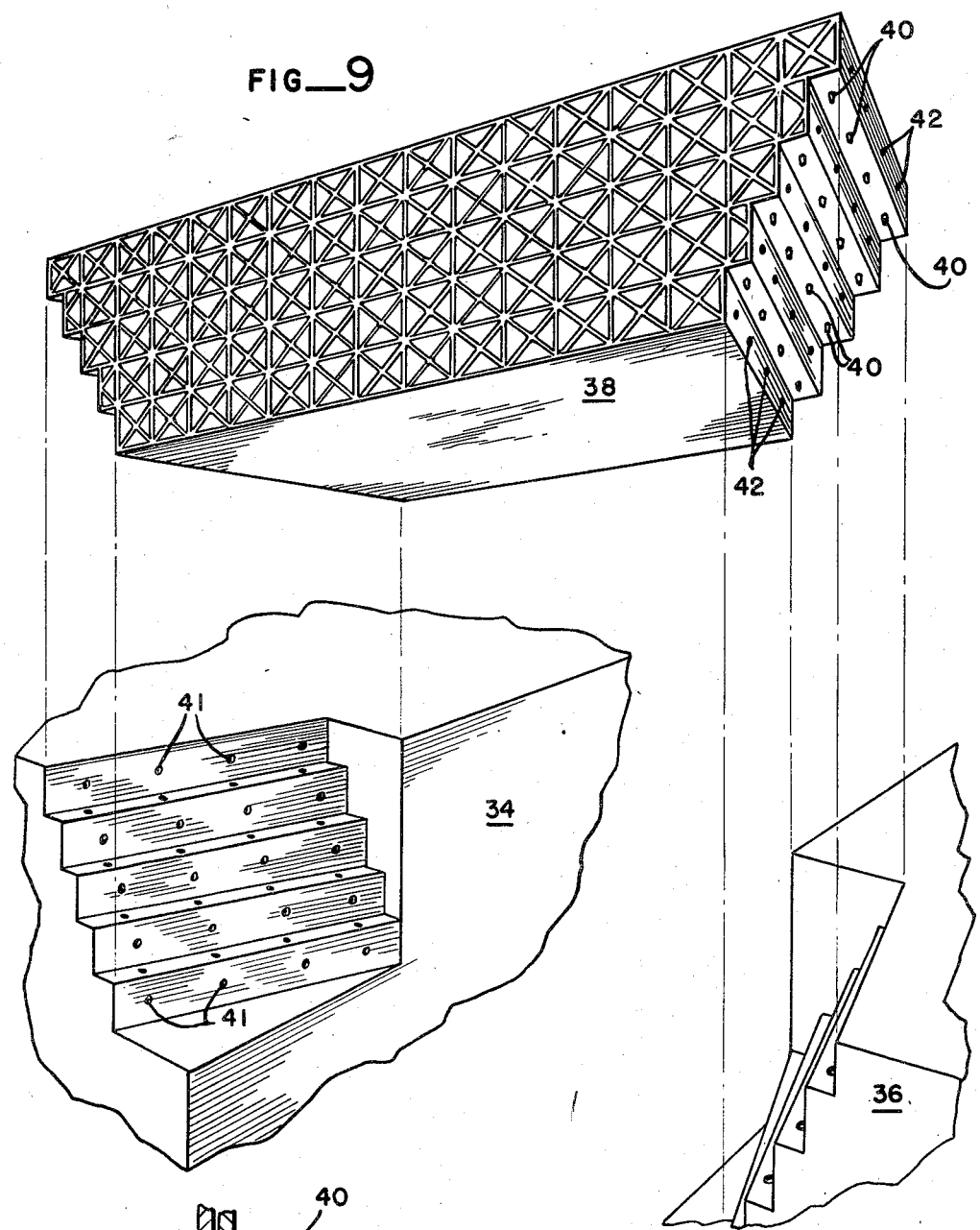

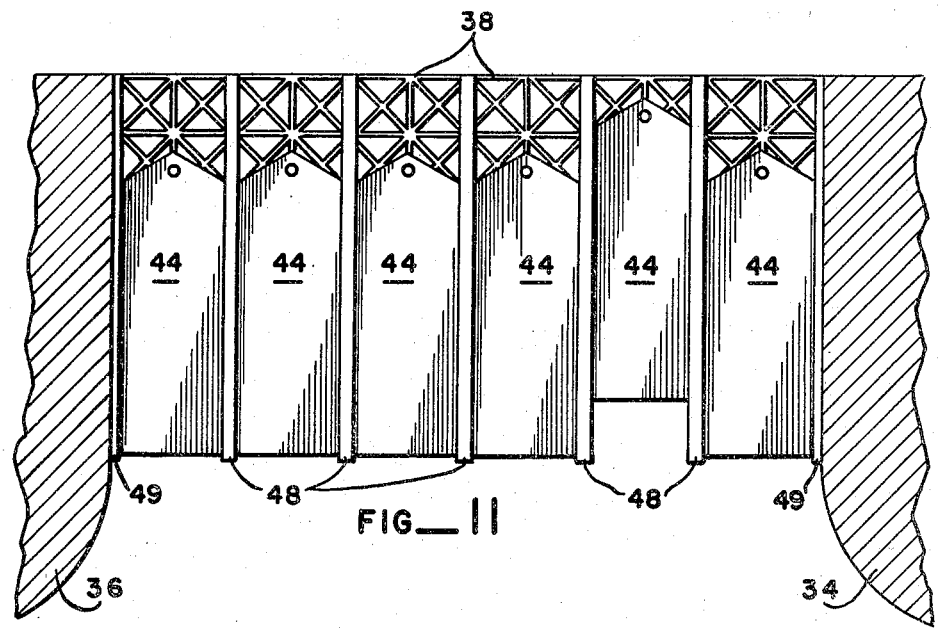
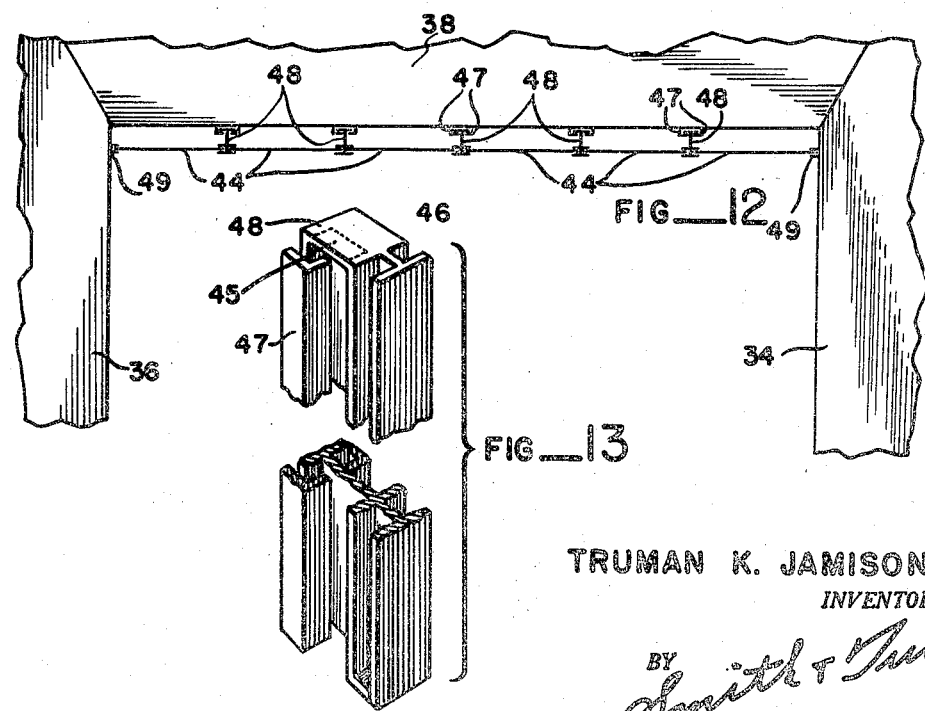

July 24, 1951 T. K. JAMISON 2,561,926
SALVAGE VESSEL
Filed Jan. 24, 1948 10 Sheets-Sheet 8
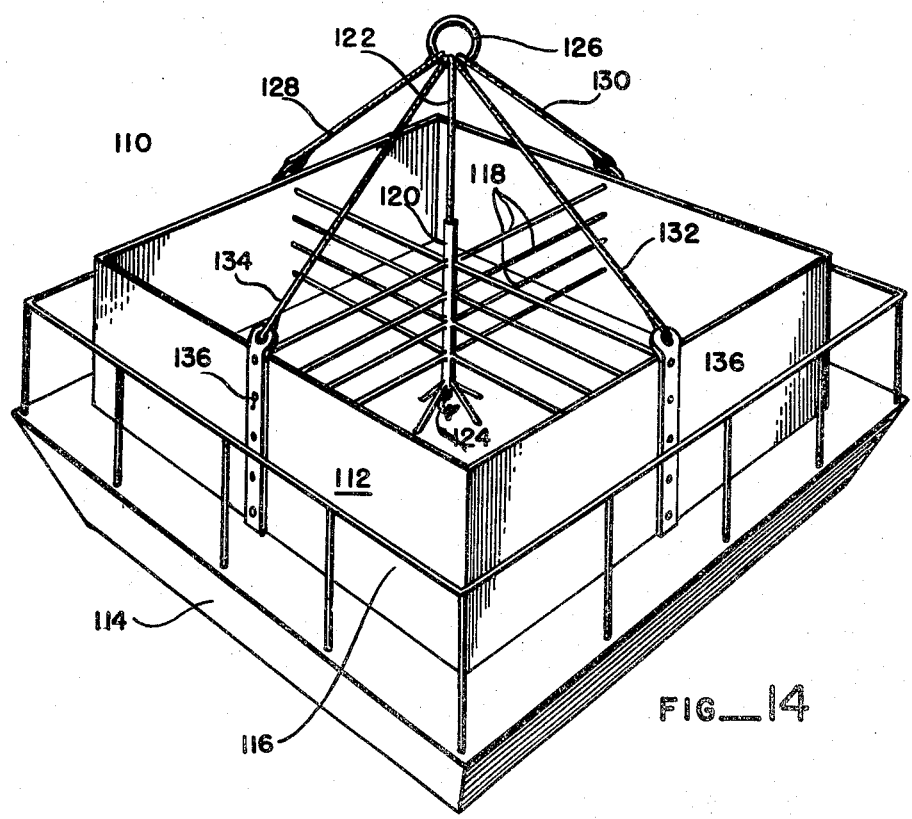
FIG_14
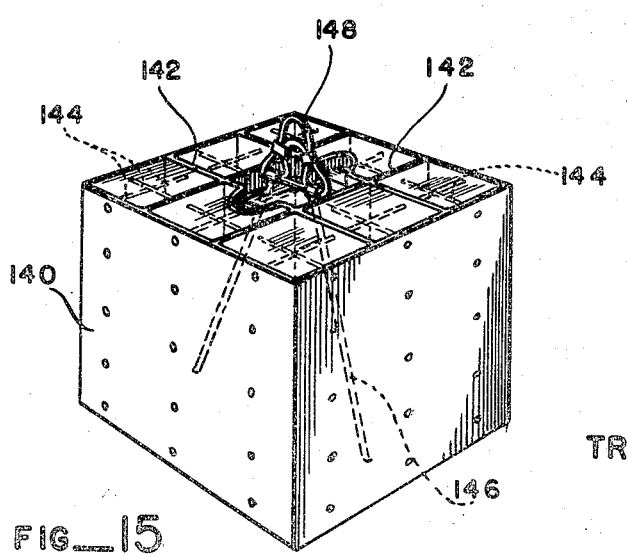
FIG_15
TRUMAN K. JAMISON
INVENTOR.
BY Smith & Tuck
ATTORNYS

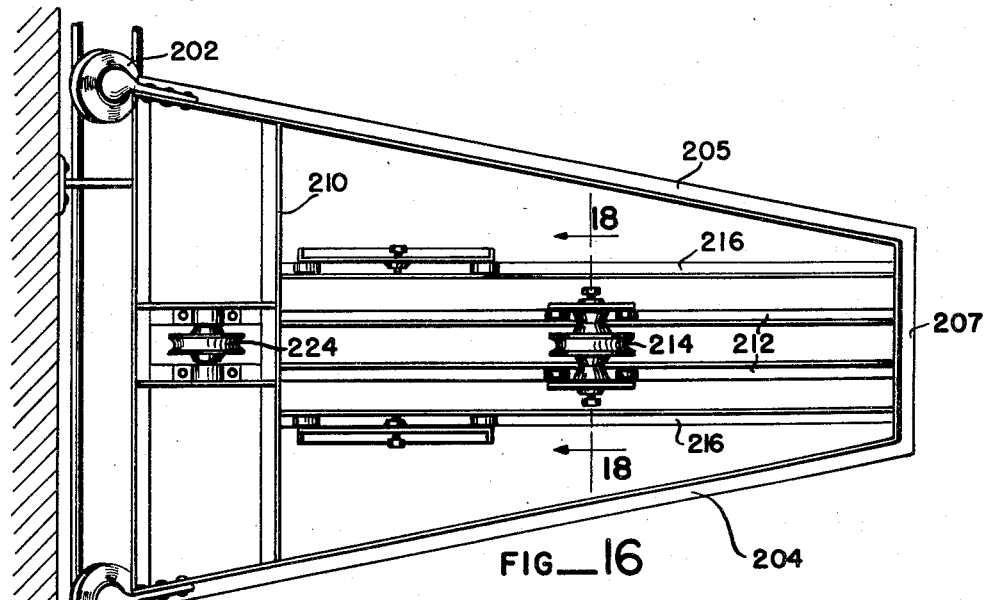
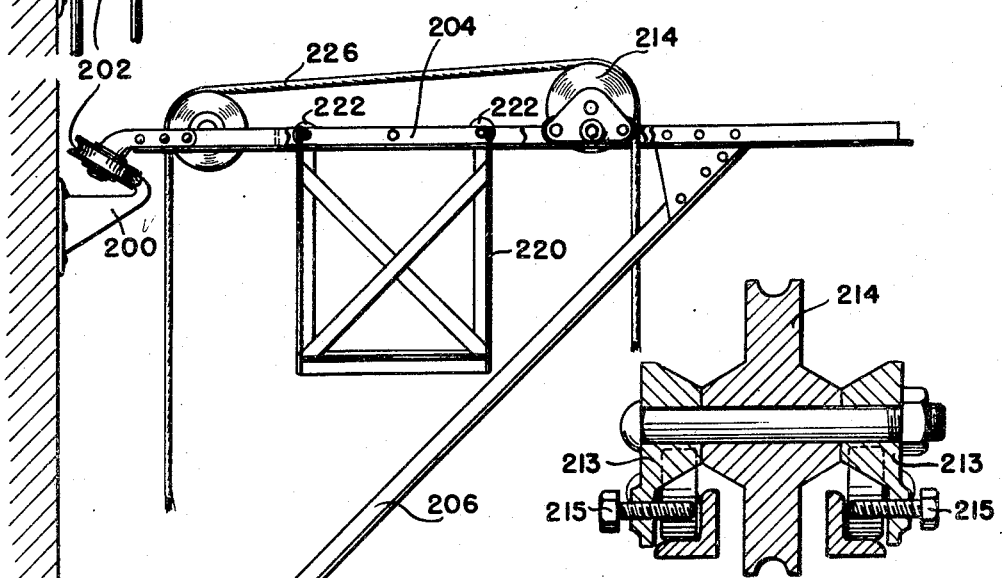

July 24, 1951 T. K. JAMISON 2,561,926
SALVAGE VESSEL
Filed Jan. 24, 1948 10 Sheets-Sheet 10
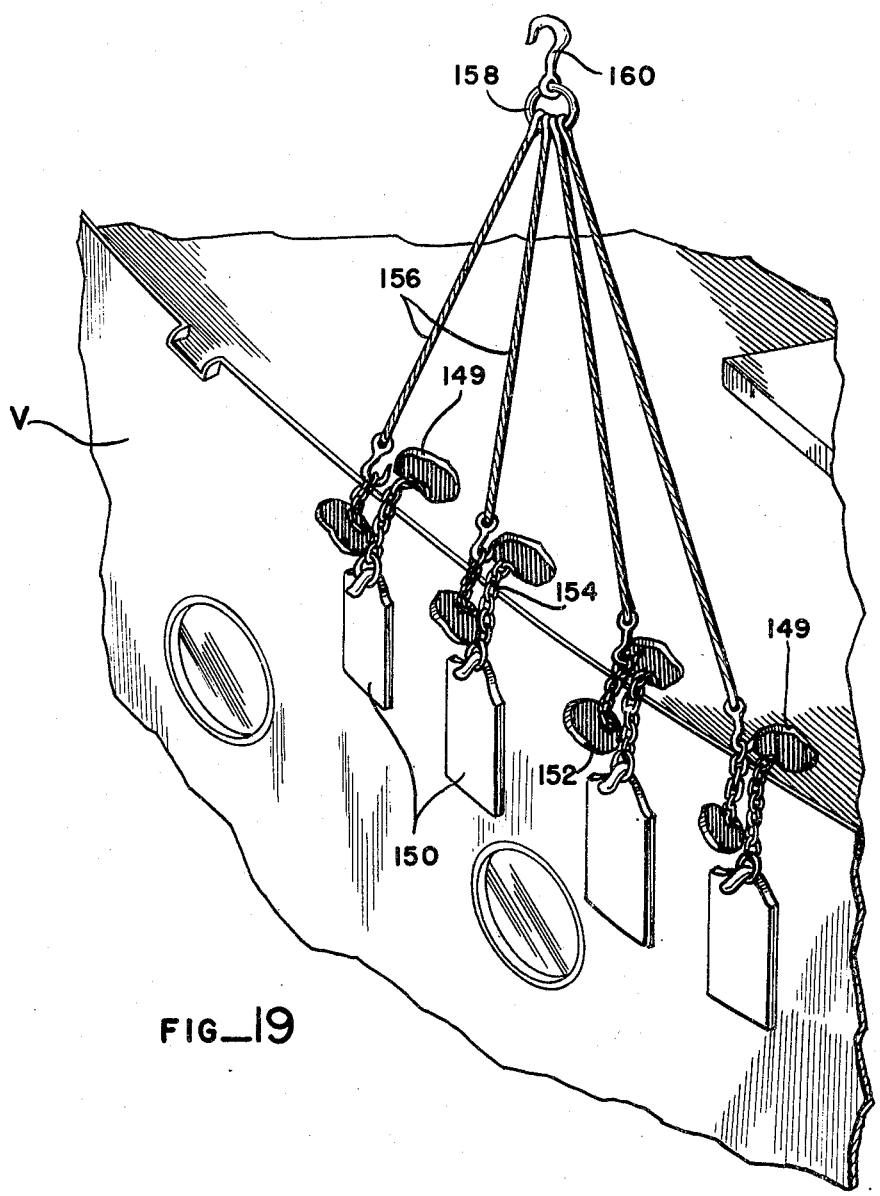
FIG_19
TRUMAN K. JAMISON
*INVENTOR.*
BY *Smith & Tuck*
ATTORNEYS Patented July 24, 1951

2,561,926

UNITED STATES PATENT OFFICE 2,561,926

SALVAGE VESSEL

Truman K. Jamison, Seattle, Wash.

Application January 24, 1948, Serial No. 4,169

2 Claims. (Cl. 114—51)

My present invention relates to improvements in a salvage vessel and, more particularly, to a mechanism and means adapted for raising and conveying sunken vessels from a submerged position.

It is my experience that the art of raising sunken vessels is poorly developed from an engineering standpoint to such a degree that the present devices are poorly designed, inefficient for the purposes intended, and wholly inadequate for the salvage of vessels from substantial depths under adverse conditions of winds and waves.

It is, therefore, a prime object of this invention to provide a salvage vessel which will be capable of self-powered movement, will be suitable to raise and receive sunken vessels, and which will shelter and protect a damaged and unfloatable vessel after it has been raised and during transport from the scene of salvage.

Another object of the invention resides in the provision of novel anchoring means for such a salvage vessel that will preclude harmful movement under severe weather conditions.

A further object resides in the provision, in a salvage vessel of the type described, of hoisting means that will be flexible in use and will permit adjustments of the salvaged vessel as to its aspect of keel and the like.

One other object of the invention is to provide a novel hoisting arrangement that will permit the use of great force without subjecting the salvage vessel to undue strains and stresses during the salvage operation.

Yet another object lies in the provision in a salvage vessel as mentioned, of means for dampening wind and wave effects to the end that the operation is conducted under sheltered conditions without exposure of the workmen to the open sea at its worst.

Other objects and advantages of the invention will become apparent during the course of the following description when taken in view of the accompanying drawings, in which:

Fig. 1 is a plan view of the main deck of my salvage ship, showing a salvaged vessel in its raised position;

Fig. 2 is a typical view in cross-section through either the port or starboard arm of my salvage ship;

Fig. 3 is a schematic cross-sectional view of a salvage ship and a vessel to be salvaged prior to lifting the latter to the surface;

Fig. 4 is a similar view showing the salvaged vessel in the raised position;

Fig. 5 is a plan view detailing a shock absorber mechanism used in my salvage vessel;

Fig. 6 is a cross-sectional view taken on the line 6—6 of Fig. 5;

Fig. 7 is an enlarged detail of a cable break used in my salvage ship;

Fig. 8 is a cross-sectional view taken on the line 8—8 of Fig. 7;

Fig. 9 is an exploded view in perspective showing a removable structural section of my salvage vessel;

Fig. 10 is a detail in section of a pin and socket assembly used to position the removable section of Fig. 9;

Fig. 11 is a face view of wave dampening means used in connection with the removable section of Fig. 9;

Fig. 12 is a plan view of the mechanism shown in Fig. 11;

Fig. 13 is a bracketed perspective view of a guide of the wave dampening means;

Fig. 14 is a perspective view of one of the counterbalance cribs;

Fig. 15 is a perspective view of a weight used in the counterbalance crib;

Fig. 16 is a plan view of an over-hanging traveling frame employed in my salvage vessel;

Fig. 17 is a side elevational view of the frame shown in Fig. 16;

Fig. 18 is a sectional view taken along the lines 18—18 of Fig. 16; and

Fig. 19 is a fragmentary perspective view showing my methods of attaching lifting cables to a vessel to be salvaged.

Referring to Figs. 1 and 2, the main hull 30 of my salvage ship is of U-shaped construction, comprising a bow section 32 between a port arm 34 and a starboard arm 36. Each arm of the salvage vessel is in effect a self contained ship having the usual compartments containing propelling machinery, crew's quarters, equipment stowage, bulkheads, hatchways, etc., and is patterned after the contemporary "tender" ships in use by the United States Navy, having the various repair shops, such as machine shop, foundry, sheet metal shop, shipwright's shop, and others, necessary for the repair of damaged vessels.

In this connection it is pointed out that there are in existence today hundreds of ships built for use in the recent war that can be considered as scrap for ordinary peace time use. In the interest of economy, two identical ships are converted to a very satisfactory base for a salvage vessel by the simple addition of a bow section 32 and incidental minor alterations to the remainder of the hulls. Each arm has propelling mechanism and a rudder and associated steering mechanism. The steering and propelling mechanism controls are brought together in the bow of the salvage vessel and are led to a single set of controls on the bridge 37.

The sterns of the two arms 34, 36, are connected by a structural span member 38. This span member serves to strengthen the ship, making it a single unit capable of withstanding the tremendous forces encountered in storms at sea. This span member will of course only be removed when the salvage ship is in a protected harbor and then only to allow the removal of a salvaged vessel or for minor repairs. In Figure 1, span 38 is shown in skeleton form but normally is provided with a decking as shown in Figure 12 to permit it to readily be used as a work area when a salvage operation is in progress.

Referring more particularly to Fig. 9, it can be seen that the span member is built up of steel shapes angularly braced to form a rigid unit similar to the usual bridge constructions. It will be noted that the span member has a keystone shape in plan view, and a stepped construction at each end and the two arms 34, 36, have a matching stepped construction to receive the span member. Spaced at regular intervals on the horizontal surfaces of the steps in the span member is a series of tapered pins 40. When the span member is dropped into place, these pins enter co-axial sockets 42 fitted into the horizontal surfaces of the matching steps in the hull arms 34 and 36. The vertical surfaces or risers of the steps in the arms and in the span member are then bolted together at 41 and 42.

Referring to Figs. 11, 12, and 13, a wave dampening means for the after-end of the channel of my salvage vessel is shown. Between the arms 34 and 36 of the vessel and preferably forward of the bridging element 38, I mount gates 44 in grooves 46 formed along the edges of upright guide members 48. U-shaped members 49 carried by the port and starboard arms 34 and 36 accommodate the edges of the marginal gates. Guide members 48 are removably mounted on bridge member 38 by means of trackways formed between opposed flange members 47 against the upper edges of which overhanging lips 45 abut when bars 48 are fully down.

Arranged laterally on the port and starboard arms and spaced equi-distant are the series of arches 50. These arches are formed of two spaced apart rails 52 and 54 rigidly secured to the ship and have mounted along their peripheries at regular intervals sheaves 56, as probably best shown in Fig. 2. At the outboard and inboard sides of each arch and in alignment with sheaves 56 are sheaves 58 and 60, respectively, supported by brackets 62 and 64, respectively. Sheaves 56, 58 and 60 form the guideway for lift cable 66. On arch 50 and located between sheaves 56 are cable control brakes 68.

Referring to Figs. 7 and 8, I have shown a lower shoe plate 70 with a longitudinal groove 72 forming a slideway for cable 66. Directly over shoe plate 72 and cable 66 is the upper shoe plate 74, also having a shaped groove 76, and disposed above shoe plate 74 is a pressure plate 78. These various plates are held in alignment by a series of guide pins 80 located along each side of the shoe assembly. At right angles to the brake assembly 68 and mounted on a vertical pivot arm 82 is lever arm 84, one end of which bears on the center of pressure plate 78, the other end being connected to a vertical hydraulic cylinder 86 by means of the ball and socket joint 88. Cylinder 86 has a pivoted base at 90 and is provided with intake and exhaust lines 92 and 94 and valves 96 and 98, respectively. This cylinder will generally be operated by steam, since this is most commonly available on present day ships, but it could of course use any fluid means, such as air or oil.

Upon opening valve 96, piston 100 will be forced upward, causing lever arm 84 to swing about fulcrum 102, applying pressure to plate 78. This pressure is transmitted by means of compression springs 104 to upper shoe plate 76, causing cable 66 to be frictionally engaged by both upper and lower shoe plates, thus providing a very effective brake. When valve 96 is closed and exhaust valve 98 opened, pressure is released and compression springs 106 release the brake.

As detailed in Fig. 14, lift cables 66 are attached at their outboard ends to counter balance cribs 110. Crib 110 consists of a rectangular box 112, with a bottom portion 114 considerably larger than the main box, and is provided with a guard rail 116 at its outer edge, thus providing a safe working area for divers and other workmen. The bottom portion 114 is also slightly tapered to facilitate removal from a muddy ocean bottom. The walls of box 112 are held rigid by reinforcing cross rods 118. At the center of the box, cable 122 passes through vertical pipe 120 and is suitably fastened to the bottom of crib at 124, and at its upper end to ring 126. Also fastened to ring 126 are the cables 128, 130, 132, and 134, whose lower ends are secured to eyes in chain plates 136, riveted or otherwise rigidly secured to the center of each side of box 112.

Fig. 15 illustrates one of the weights to be used in handling and loading the counter balance crib. The weight takes the form of a cube and consists of a housing 140 divided into vertical compartments by spacer walls 142 and the whole reinforced by cross rods 144. Each section of the cube will then be filled with an appropriate material such as lead or concrete. Securely attached to the bottom of the cube are two rods 146 having, at their upper ends, bearings into which have been fitted a lift shackle 148. This shackle will normally fall into a recess provided for it at either side to maintain a flush surface so that the weights can be conveniently stacked in the crib or on deck.

During salvage, the weights 140 are added to the counter balance cribs 110 until a desirable loading of the cribs is obtained to tend to lift the sunken vessel V. As the vessel V moves upward, control is had of this movement to maintain an even keel or to adjust the vessel to such a condition by co-ordinated braking of the lifting cables 66. When the lift has been completed, the vessel that has been salvaged is properly secured to the salvage vessel by means of supplemental ties and the operation clean-up is carried on to remove excess weight caused by silt, damaged and useless structure, and water that has been trapped. During this time, the salvaged vessel is made watertight and, to a large degree, self-floating to relieve the salvage vessel of its weight as much as possible during movement to port or to shore.

Such lifting operations may be arranged, in the case of sloping sea bottoms, to raise the salvaged vessel off the bottom some distance, and then the salvage vessel and vessel V are moved to a point where the latter again contacts bottom. The weights are again raised and the slack taken from the lifting lines 66 and another lift is made. This process may be repeated several times and it tends to minimize the possibility that a long lift in exposed water has to be conducted since the salvage vessel may be slowly worked into shelter of the coast or to a harbor, and yet for no prolonged periods will it have to carry the entire weight of the salvaged ship.

At their inboard ends, cables 66 are fastened to the vessel to be raised as shown in Fig. 19. Divers with under-water cutting torches will cut a series of holes 149 in the deck and side of a vessel to be salvaged. Plates 150 having hooks 152 formed at the upper ends are welded to the side of the vessel. Short lengths of chain 154 are passed through the holes 149 previously cut, and one end is attached to the hook 152, the other being fastened to one of a branch of cables 156. The cable branch converges at ring 158 and hook 160. Hook 160 is suitably attached to lift cable 66.

During periods when the vessel is traveling and is subject to stresses and strains, and likewise when a heavy lift is being made, it is advisable to brace apart the port and starboard sections 34 and 36 intermediate their ends within the channel that receives the salvaged vessel. This is best accomplished by bars 164 and 165 carried on pivot pins 166 that are supported adjacent the bilge curve by ears 167. Bars 164 and 165 are rigidly secured under bracing conditions to the gunwale of the opposite arm of the salvage vessel as shown in Fig. 3, and may be swung and secured in an upright position, as indicated by dotted lines, when a vessel is raised into the channel or when these bars might be otherwise obstructing operations. In the raised position, the bars 164 and 165 may be employed as masts or booms, when properly rigged, for handling gear or the like. Bars 164 and 165 are particularly effective when an initial lift is being applied to break a sunken vessel loose from the sea bottom, when the load will be greatly augmented by suction.

In Fig. 5 I show a shock absorbing mechanism which provides a resiliency for the auxiliary weight sustaining cables 196 when they are supporting a salvaged vessel V. This shock absorbing mechanism comprises a rectangular housing 170 divided vertically across the middle wall 172 secured at its ends and sides to the wall of the housing. A cross-bar 174 is positioned in one of the chambers to move therein along the longitudinal axis of the housing under the overhanging flanges 176 and on ways 178 in the lower portion of the housing. A pull rod 180 is secured at one end to cross-bar 174, passes through the intermediate wall 172 and through the end wall 182 of the housing, and has hook 181 formed thereon. On either side of rod 180 is a guide rod 184, which likewise is anchored to the cross-bar 174 and passes through walls 172 and 182. Compression springs 188 are mounted on the guide rods between wall 172 and cross-bar 174 to resist a pull imparted to hook 181, by the weight of vessel V transmitted through supplemental cables 196 that are usually attached to the gunwale. A tension spring 190 is anchored to the opposite side of wall 172, against which springs 188 rest, and it is also anchored to a rod 184, as can be seen in Fig. 5. Tension springs 190 complement springs 188 when a pull comes on hook 181 and bar 180. The ends 186 of bars 184 pass through suitable guide openings in wall 182, and cables 196 are secured between hooks 181 and a sunken vessel after being passed over suitable guide sheaves or the like to tend to relieve some of the weight of vessel V from the actual lifting cables 66, this relieved weight being absorbed by springs 188 and 190.

In cross-section the housing 170 is shown in Fig. 6 to have notched grooves 177 in the lower outer edges to fit the housing to tracks 178, along which the housing may be moved. The housing is usually anchored in position by anchoring means fastened between the ship and eye 192.

For the purpose of facilitating the support and positioning of workmen and, particularly, the divers usually employed in a salvage operation, I employ tracks 200 and 201 spaced vertically apart and extending longitudinally of the salvage vessel along the channel between arms 34 and 36. Track 200 receives wheels 202 of the overhanging frame 204, 205 which is supported in cantilever manner by lower legs 206 which have wheels 208 that roll along track 201. Members 204, 205, are connected by crosshead 207 at their outer ends and by intermediate crossbar 210, between which two crossbars extend inner tracks 212 that support sheave 214 for variable positioning. Outer tracks 216 form a trackway for the hanging working stage 220 for tenders and other workmen, and this stage has offset rollers 222 that roll along track 216. An inboard sheave 224 is located on suitable supporting frame elements in line with sheave 214 and a cable 226 on the inboard end passes to a winch while its outer end carries the usual working stage, not shown, for the divers. With such a traveling frame movable along the salvage vessel, a diver may be let down at any desired point at variable distances from the side of the vessel, as space permits. The usual diving attendants and other workmen may operate from staging 220.

Sheave 214 is movable along tracks 212 when the clamping screws 215 in cheek plates 213 are loosened from engagement with the flanges of the tracks, as can be seen in Fig. 18.

The raising and lowering of the diver's platform, not shown, is accomplished by reeling in or paying out the cable 226 by suitable winch means.

In Fig. 2, I show a below-deck locker 230 which is located to receive and store, or pay out the various cables required from time to time. Such cable will normally be stored on spools 232 and will be taken into and out of the locker by means of conveyors 234 between the lower part of the locker and the deck above.

Along the outboard edges of the arms 34 and 36 I arrange for shock absorbing mechanism similar to that along the margins of channels to which cables 196 are attached. Cable 240 is hooked to such an outboard shock-absorber, passed under the outer bilge and under both arm 34 and vessel V to the starboard gunwale thereof. A similar cable 242 passes from the outer margin of arm 36, around its bilge and thereunder as well as under vessel V, for attachment to the port gunwale thereof. Cables 240 and 242 constitute a springy sling, as well as centering means for locating the vessel V in a mid-position in the channel between arms 34 and 36. As vessel V is raised, of course these cables will be taken up to maintain the desired centering action.

Pontoons have been indicated at 250 as being attached along the sides and under the bottom of vessel V to aid in lifting it until it can be arranged for self supporting or floating.

While I have shown and described particular embodiments of my invention, it will occur to those skilled in the art that various changes and modifications may be made without departing

Having thus described my invention, I claim:

1. A sea-going salvage vessel, comprising: a U-shaped buoyant vessel adapted to move through the water with the arms of the U-shaped vessel directed rearwardly, removable bridging means to span between the trailing ends of said arms, each said arm having on its inboard side and forward of said bridging means a plurality of serially spaced-apart hoisting means to raise a salvaged vessel between said arms, said hoisting means each including an arcuate track formed of roller elements, said track extending from overside on the inner face of each arm to overside on the outer face thereof, cable means to move on each said track and having means on the inboard end for joinder to a vessel to be salvaged and having weighted means on the outboard end, cable gripping braking means operable upon said cable between the ends of said track, said braking means including a fixed jaw and an opposed spring-pressed movable jaw between which jaws the cable passes, a lever to press said movable jaw to said fixed jaw, and an actuator for said lever; and shock absorbing means connected between the vessel to be salvaged and each side of said arms adjacent the transverse line of the hoisting cable crossing the arm.

2. A sea-going salvage ship, comprising: a U-shaped buoyant vessel with the arms of the U-shape directed rearwardly, an openwork bridging element removably secured at each end to the rear of said arms and extending therebetween, upright track elements carried by said openwork bridging element, gate means slidably mounted in said track elements on said bridging element, and hoisting means carried by said arms forward of said bridging element to elevate a salvaged vessel between said arms.

TRUMAN K. JAMISON.

REFERENCES CITED

The following references are of record in the file of this patent:

UNITED STATES PATENTS

| Number | Name | Date |
|--------|------|------|
| 141,083 | Siebe et al. | July 22, 1873 |
| 682,536 | Duncanson | Sept. 10, 1901 |
| 957,315 | Duncanson | May 10, 1910 |
| 1,300,954 | Gray | Apr. 15, 1919 |
| 1,622,866 | Gardner | Mar. 29, 1927 |
| 1,791,305 | Gerli | Feb. 3, 1931 |